Figure 1:
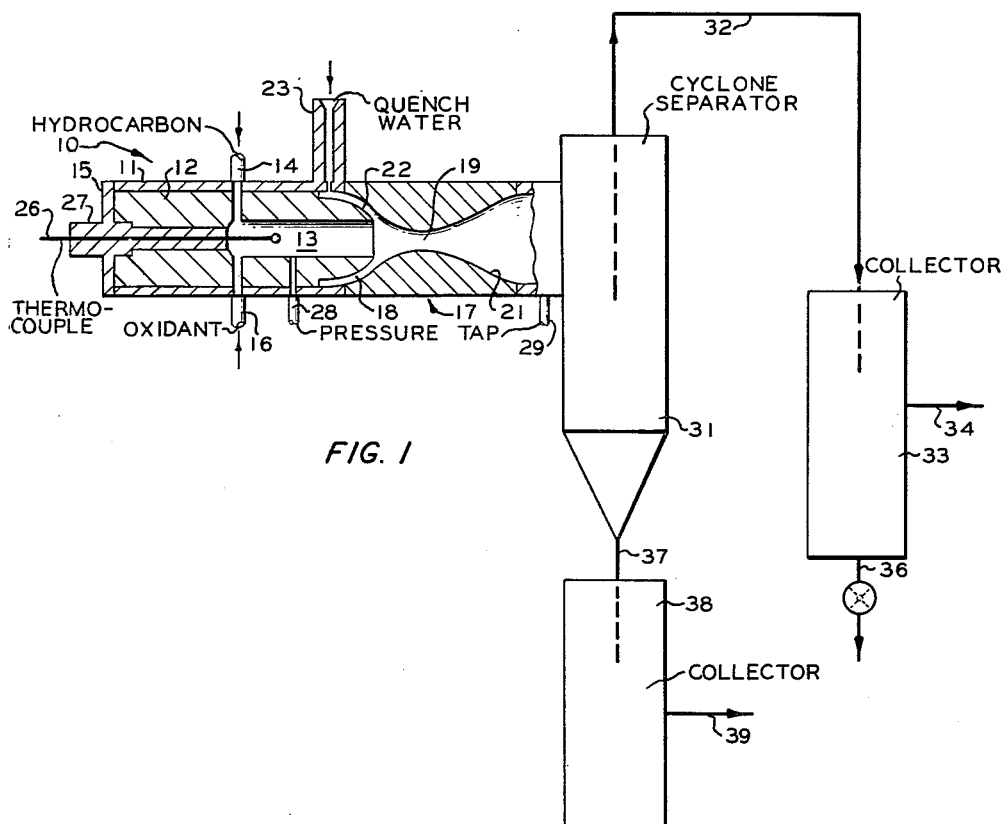

INVENTOR.
M. M. JOHNSON
BY
Hudson and Young
ATTORNEYS

United States Patent Office 3,049,574
Patented Aug. 14, 1962

3,049,574
PROCESS AND APPARATUS FOR THE OXIDA-
TIVE DEHYDROGENATION OF ORGANIC
COMPOUNDS
Marvin M. Johnson, Bartlesville, Okla., assignor to Phillips Petroleum Company, a corporation of Delaware
Filed Jan. 15, 1959, Ser. No. 787,053
13 Claims.  (Cl. 260—666)

This invention relates to the oxidative dehydrogenation of organic compounds. In one aspect, it relates to the production of olefins by the oxidative dehydrogenation of saturated organic compounds. In another aspect, it relates to a novel reactor system for use in the oxidative dehydrogenation of organic compounds.

In recent years, developments in the chemical industry have resulted in increased demands for petrochemical starting materials such as ethylene, propylene, 1-butene, cyclohexene and the like. The demand for such materials cannot be conveniently satisfied by simple fractionation of refinery streams so that it becomes important to provide a successful commercial process for their production. Processes for the production of unsaturated hydrocarbons by oxidative dehydrogenation are described in the literature. While in some instances rather high product yields are claimed, it has been found that the processes are unsuitable for obtaining such yields in a commercial operation. The failure of prior art processes to meet the rigid requirements of a successful commercial operation can be attributed at least in part to the inefficient and unsatisfactory methods used in treating the reaction products obtained from the oxidative dehydrogenation reaction. For example, in one prior art process, cooling of the reaction products is accomplished by means of indirect heat exchangers which employ ice or Dry Ice. While such a method may be satisfactory for laboratory applications, it would be unsuitable for a plant operation, particularly from an economic standpoint because of the high cost of refrigeration. It has also been indicated that water can be used to quench the reaction products from an oxidative dehydrogenation reaction. However, the methods disclosed for contacting the reaction products with water fail to accomplish the necessary cooling and the proper mixing which are required to give consistently high product yields.

It is, therefore, an object of this invention to provide a process for producing olefins by oxidative dehydrogenation in which high product yields are consistently obtained.

Another object of this invention is to provide an oxidative dehydrogenation process in which provision is made for rapidly and effectively cooling the reaction products.

Still another object of the invention is to provide an oxidative dehydrogenation process which is particularly adapted for the recovery of hydrogen peroxide which is formed in the process.

A further object of the invention is to provide an improved reactor and product recovery system for use in an oxidative dehydrogenation process.

Other and further objects and advantages of the invention will become apparent to those skilled in the art upon consideration of the accompanying disclosure.

The present invention resides in an improved process and apparatus for producing olefins by the oxidative dehydrogenation of organic compounds. In one embodiment, in a process in which an organic compound and an oxygen-containing gas contact one another in a reaction zone under conditions of temperature and pressure and for a contact time suitable for producing reaction products containing unsaturated organic compounds, the invention resides in the improvement which comprises flowing the reaction products from the reaction zone through an elongated mixing zone having a constricted section formed in an intermediate portion thereof, maintaining the ratio of the pressure in the reaction zone to the pressure in the downstream end of the mixing zone at such a value that the reaction products, together with cooling medium subsequently described, attain sonic velocity in the constricted section of the mixing zone, introducing a cooling or quenching medium, such as water, into the reaction products flowing from the reaction zone and through the mixing zone, the cooling medium being introduced upstream from the constricted section of the mixing zone, and recovering stable reaction products from the downstream end of the mixing zone.

In another embodiment, the invention is concerned with a novel reactior and product recovery system which comprises an elongated, tubular reactor, closed at one end and open at its other end, fluid inlet and fluid outlet means attached to the reactor, a nozzle comprising a converging section, a throat section, and a diverging section, the converging section being attached to the open end of the tubular reactor, a liquid introduction means adapted to inject a cooling medium into the reaction products at a point upstream from the throat section of the nozzle, and a centrifugal separation means attached to the diverging section of the nozzle.

The process of the present invention involves the reaction of an organic compound with oxygen, and at least a part of the overall reaction which occurs can be illustrated by the following equation:

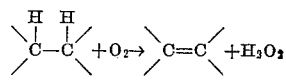

As seen from the foregoing equation, the reaction involves the removal of one hydrogen atom from each of two adjacent carbon atoms and the formation of a double bond between the carbon atoms. Hydrogen peroxide is formed as an important by-product of the process, and this material can be readily recovered by proceeding in accordance with the present invention.

The organic compounds which are preferably used as starting materials in the oxidative dehydrogenation process of this invention are those which have from 2 to 20 carbon atoms per molecule and which are readily vaporized at temperatures in the approximate range of 600 to 1800° F. Specific compounds which can be employed include saturated aliphatic compounds such as ethane, n-pentane, isopentane, 3-methylhexane-2-methylheptane, n-octane, n-decane, n-eicosane, and the like. Cycloparaffins, such as cyclopentane, cyclohexane, and decahydronaphthalene, and substituted cycloparaffins, such as alkyl-substituted cycloparaffns, e.g., methylcyclopentane and methylcyclohexane, can also be advantageously employed in the practice of the present invention. When employing the acyclic and alicyclic hydrocarbons and alkyl substituted alicyclic hydrocarbons, good yields of the corresponding olefins are obtained. For example, good yields of pentenes can be obtained when using normal pentane as the starting material, or cyclohexane can be readily converted to cyclohexene. While the present invention is particularly applicable to saturated organic compounds, it is to be understood that unsaturated organic compounds can be used as starting materials. For example, alkyl-substituted aromatic compounds, such as ethyl benzene and isopropyl benzene, can be converted to alkenyl-substituted aromatic compounds, such as styrene and alpha-methyl styrene.

The oxidative dehydrogenation of the organic compounds is carried out with an oxidant such as oxygen or an oxygen-containing gas. It is usually preferred to employ air since the inert gases present in the air can be readily separated from the reaction products. However, pure oxygen can also be used, and its employment is often preferred when it is desired to eliminate the presence of inert gases. It is also within the scope of the invention to employ pure oxygen diluted with other gases, such as carbon dioxide and helium. Furthermore, combustion gases containing residual oxygen, preferably in amounts of 5 or more percent by volume, can be utilized.

The reaction of the organic compound with the oxygen-containing gas occurs at a temperature in the approximate range of 600 to 1800° F. Since the reaction involved is exothermic, it is unnecessary to supply heat to the reaction zone except, if desired, during the startup of the process. Prior to introduction into the reaction zone, the reactant materials are preheated to a temperature sufficient to give the desired reaction temperature. It is to be understood that each of the gaseous reactant materials can be heated to the same temperature or to different temperatures. In general, the reaction is effected at pressures above atmospheric pressure since the centrifugal separation means connected to the nozzle is conveniently operated at about atmospheric pressure. Reaction pressures in the range of 35 to 1000 p.s.i.a., more desirably between 60 and 400 p.s.i.a., are employed when the pressure at the nozzle exit, e.g., within the centrifugal separation means, is near atmospheric pressure. It is to be understood that nozzle exit pressures above atmospheric can be utilized so long as the relationship between the reaction pressure and the exit pressure is such that the reaction products flow at sonic velocity through the nozzle throat. Furthermore, pressures as low as 1 p.s.i.a. and lower can be used when the nozzle exit pressure is reduced sufficiently to ensure that the reaction products attain sonic velocity in the nozzle throat. Since the reaction of this invention is carried out at temperatures above the critical temperature of the reactants, the gas phase reaction can also be carried out at very high pressures, e.g., up to about 100,000 p.s.i.a. The reaction rate is increased by raising the pressure in the reaction zone; so the actual pressure used will also be dependent upon the reaction rate which it is desired to obtain.

As seen from the formula set forth hereinabove, one molecule of oxygen is required for every olefinic group that is formed. However, in order to avoid the danger of forming explosive mixtures, it is usually preferred to utilize higher mol ratios of organic compound to oxygen. Thus, the mol ratio of the organic compound to oxygen is preferably at least 3 and more desirably at least 4. It is within the purview of the invention to employ a mol ratio of organic compound to oxygen as high as 10 and even higher.

The reaction times employed in the practice of the present invention are less than about 1.0 second, generally being between 0.0001 and 0.1 second. In accordance with the present process, the organic compound and the oxygen containing gas introduced into the reaction zone are rapidly mixed therein and reacted. Thereafter, the reaction products are flowed through a nozzle, which constitutes a mixing zone, at sonic and supersonic velocities. Prior to the attainment of sonic velocity, which occurs in the constricted or throat section of the mixing zone, the reaction products are contacted with a cooling or quenching medium. As a result of the conditions of flow prevailing in the mixing zone coupled with the addition of the cooling medium, the reaction products are rapidly cooled and maintained at a temperature at which they are stable. The reaction products are cooled to a temperature below 600° F., generally between about 50 and about 300° F. For example, in a preferred operation the reaction products are cooled to a temperature in the range of 100 to 200° F. By controlling the length of the reaction zone and the point at which the cooling medium is introduced into the mixing zone, it is possible to accurately control the reaction or residence time of the reactant materials. As will be discussed more in detail hereinafter, the point at which the cooling medium is caused to contact the reaction products constitutes an important aspect of the invention.

In carrying out the present process, it is preferred to employ water as the cooling or quenching medium. Usually, from 1 to 12 mols of water per mol of the organic compound is employed. However, if desired, greater amounts of water can be used in order to increase the rate of cooling and the dilution of the aqueous phase formed as a result of the water introduction. Water having a temperature in the range of 50 to 170° F. can be utilized although in some cases it may be desirable to chill the water to its freezing point or to employ a slurry of ice in water. Furthermore, it is within the scope of the invention to use aqueous solutions as the cooling or quenching medium. For example, water containing dissolved ammonia can often be used with advantage since the ammonia neutralizes any acids which may be present in the reaction products. In this regard, ammonia gas can also be injected into the reaction zone along with the oxidant. Other compounds which can be dissolved in water include alkalis, such as ammonium carbonate, sodium bicarbonate, potassium hydroxide and the like, and reducing agents, such as sodium bisulfite.

Figure 2:
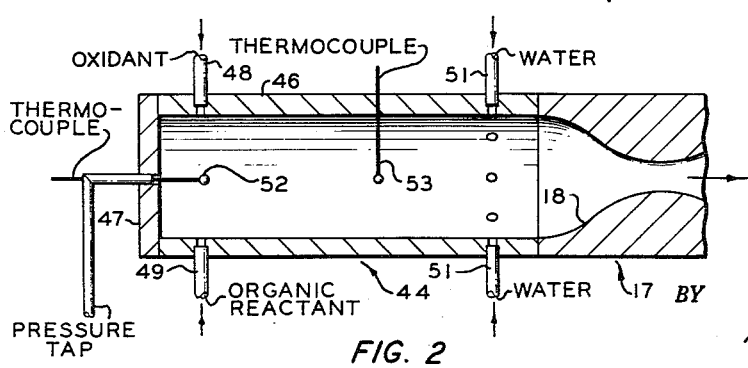

A more comprehensive understanding of the invention can be obtained by referring to the following description and the drawing, in which:

FIGURE 1 is a schematic representation, partly in section, illustrating a preferred embodiment of the invention; and FIGURE 2 is an elevational view in section showing a modification of the reactor system of the present invention.

Referring now to FIGURE 1 of the drawing, reactor 10 comprises a cylindrical enclosure member 11 which is closed at one end by a suitable closure member 15. Positioned within cylindrical member 11 is a tubular insert or core member 12 which encompasses an elongated reaction zone 13. A pair of fluid inlet means 14 and 16 provide means for separately introducing an organic compound and an oxidant into the upstream end of reaction zone 13. As illustrated, the two fluid inlets are radially disposed and diametrically opposed. It is preferred to employ this type of placement of the fluid inlet in order to obtain good mixing of the organic compound and oxidant in the reaction zone. It is to be understood that more than two fluid inlets can be utilized in carrying out the present process. It is also within the scope of the invention to utilize jets as the fluid inlets in order to obtain impingement of the reactant materials upon their introduction into the reaction zone. While it is preferred to employ a reactor in which the fluid inlets are disposed as described, it is to be realized that the fluid inlet means can be otherwise positioned without departing from the spirit and scope of the present invention. For example, it is within the purview of the invention to introduce one of the reactant materials radially while the other material is injected as a stream parallel to the longitudinal axis of the reactor.

A nozzle 17 is attached to the downstream end of cylindrical member 11 in a manner such that its longitudinal axis coincides with the longitudinal axis of reaction zone 13. Nozzle 17 comprises a converging section 18, a throat section 19, and a diverging section 21, the converging section being attached to cylindrical member 11. It is to be noted that the downstream end of core member 12 is tapered so that it extends into the converging section of nozzle 17. The sides of the converging section and the tapered end of the core member are spaced apart so as to provide an annular passageway 22 therebetween. An inlet conduit 23 attached to the downstream end of cylindrical member 11 provides means for introducing a cooling or quenching medium into nozzle 17 at a point upstream from throat section 19. While only one inlet conduit is shown, it is to be understood that a plurality of such conduits can be utilized.

A temperature measuring means, such as thermocouple 26, is positioned in the reaction zone to provide means for measuring reaction temperatures. Thermocouple 26 is held in position by means of bushing member 27 which passes through the end of cylindrical member 11 and core member 12. The thermocouple is further connected to a temperature recording device (not shown) which provides a continuous record of reaction temperatures employed in the process. Line 28 communicates with the interior of reaction zone 13 while a similar line 29 is connected to the downstream end of nozzle 17. Lines 28 and 29 function as pressure taps and are further connected to suitable pressure gages to provide means for measuring the pressures within the reaction zone and at the downstream end of the nozzle.

The downstream end of diverging section 21 of nozzle 17 is connected to a continuous centrifugal separator. It is usually preferred to employ a liquid cyclone separator 31 since it is easy to operate and has a high volumetric capacity. The converging section of the nozzle is preferably connected directly to the tangential inlet of the liquid cyclone in order to effect as rapid a separation as possible. While a single cyclone is illustrated as being used, it is to be understood that a plurality of cyclones, arranged in series, in parallel, or with part in series and part in parallel, can be employed in the practice of the invention. When using more than one cyclone, the individual cyclones can be of the same or of different sizes. Line 32 attached to the upper portion or vortex finder of cyclone separator 31 is further connected to collector 33. Collector 33 is provided with lines 34 and 36 for the removal of materials collected therein. Line 37 attached to the lower portion or apex of cyclone separator 31 is further connected to collector 38 provided with outlet lines 39 and 41.

In the practice of the process of this invention, utilizing the apparatus shown in FIGURE 1, an organic material, such as cyclohexane, is introduced into reaction zone 13 through inlet line 14. Upon introduction into the reaction zone, the cyclohexane is contacted with an oxidant, such as air, which is charged to the zone through inlet line 16. Prior to their passage into the reaction zone, the oxidant and the hydrocarbon are preheated to the reaction temperature at which it is desired to conduct the process. As previously mentioned, this temperature generally falls in the range of about 600 to 1800° F. The reactant materials are injected into the reaction zone under pressure provided by the utilization of suitable compressors of a conventional type, which are not shown in the drawing. It is usually preferred to maintain a reaction pressure in the range of 60 to 400 p.s.i. although higher and lower presures can also be utilized. Thermocouple 26 provides means for measuring the reaction temperature and to make any desired adjustment in the heating of the reactant materials. The pressure in the reaction zone can be adjusted by varying the pressure of the reactant materials charged to the reaction zone. Pressure tap 28 and its associated pressure gage (not shown) provides means for determining the pressure in the reaction zone at any given time. During startup of the process, it is often desirable to introduce air and steam, preheated to the desired reaction temperature, initially into the reaction zone. After the pressure and temperature in the system have bcome stabilized, and the steam is then shut off, and the preheated hydrocarbon is then fed to the reactor.

The reaction products formed by reaction of the cyclohexane and air flow through reaction zone 13 and thereafter pass into nozzle 17. The nozzle in effect constitutes a mixing zone for the reaction products and the cooling medium. As the reaction products enter the converging section of the nozzle, they come into contact with a cooling or quenching medium, such as water, which is introduced into the system through a conduit 23. The water so introduced flows through annular passageway 22 and enters the converging section of nozzle 17. The cooling medium so introduced, which is thereafter intimately mixed as a fine spray or fog with the reaction products, functions, as hereinafter described, in preventing the temperature of the reaction products from increasing any substantial amount above that to which they are cooled in flowing through the nozzle. This temperature is, of course, considerably lower than the reaction temperatures and is usually in the range of 100 to 200° F. As used herein, the reaction or residence time is computed as being the time between the introduction of the reactant materials into the reaction zone and the time at which the reaction products reach the throat of the nozzle. The reaction time depends upon several factors, including the volume of the reaction zone and the mass rate of throughput. Since these factors can be readily adjusted and varied, the present invention provides a flexible process in which residence times can be closely controlled.

The location in the system at which the cooling or quenching medium first comes into contact with the reaction products constitutes an important aspect of the present invention. Thus, it has been discovered that the quenching medium must contact the reaction products at a location upstream from the constricted or throat section of nozzle 17 if the desired cooling of the reaction products is to be obtained. In order to obtain the desired cooling of the reaction products, it has also been found to be necessary that the reaction products attain at least a sonic velocity in the constricted or throat section of the nozzle. Thus, to define the preferred point of introduction of the quench medium in another manner, the medium is injected at such a location that it comes into contact with the reaction products prior to their attainment of sonic velocity, i.e., upstream from the nozzle throat section. Introduction of the cooling medium downstream from the nozzle throat section has been found to give unsatisfactory cooling of the reaction products. If water is injected downstream from the nozzle throat, the intimate mixing of the water and the reaction products does not seem to occur, and the temperature of the reaction products increases to nearly the reaction temperature.

The attainment of sonic velocities in the throat section of nozzle 17 is important in order to obtain accurate control of the process reaction time and to effect the desired cooling of the reaction products. The conditions necessary for obtaining sonic velocity can be obtained by controlling the pressures in the reaction zone and in the downstream end of the diverging section of the nozzle 17. For a perfect gas mixture, sonic velocity in the nozzle throat is reached when the ratio of static pressure in the reaction chamber ($P_c$) to the exit pressure of the nozzle ($P_e$) equals or exceeds the value given in the following equation:

$$\frac{P_c}{P_e} \geq \left[\frac{2}{K+1}\right]\left[\frac{K}{K-1}\right]$$

In this formula, K is the ratio of the specific heat at constant pressure to the specific heat at constant volume. Since ideal conditions do not generally prevail, the foregoing formula gives only a close approximation. The attainment of sonic velocity can be positively indicated by measuring the mass rate of flow while increasing the value of $P_c$, the value of $P_e$ being held constant. When this is done and the velocity in the nozzle throat is less than sonic velocity, the mass rate of flow increases with each increase in the value of $P_c$ until sonic velocity is reached. Thereafter, an increase in $P_c$ has little, if any, effect upon the velocity of the reaction products in the nozzle throat. The sonic or acoustic velocity, $\alpha$, can be computed according to the following equation $$\alpha = (g_c K R T)^{1/2}$$

in which K is the ratio of specific heats as previously defined, $g_c$ is the force constant, R is the gas constant, and T is the temperature in the nozzle throat. The attainment of sonic velocity is also readily apparent from the fact that the desired cooling of the reaction products is obtained only when the reaction products reach this velocity in the nozzle throat. The values of $P_c$ and $P_e$, as designated above can be readily adjusted so as to obtain the desired sonic velocity and concomitantly the desired cooling of the reaction products. For a discussion of sonic velocities and their determination, reference may be had to "Principles of Jet Propulsion and Gas Turbines," M. J. Zucrow, pages 67 to 189, John Wiley and Sons, Inc., New York, N.Y. (1948). This reference also describes DeLaval type nozzles which can be advantageously employed in the practice of the present invention. However, it is to be understood that any suitable nozzle comprising a converging section, a throat section and a diverging section can be utilized in the practice of the process of this invention.

While it is not desired to limit the invention to any specific theory, it is believed that the following discussion will assist in an understanding of the criticality of the manner in which the cooling medium is introduced into the nozzle or mixing zone. As previously mentioned, according to the present invention, conditions are so adjusted that the reaction products attain sonic velocity in the nozzle throat. In the case where only subsonic velocity is maintained in the nozzle throat, the nozzle merely functions as a venturi tube. In other words, the reaction products are accelerated in the converging section, and the pressure and temperature decrease. In the diverging section, the opposite occurs, that is, the velocity of the reaction products decreases, and the pressure and temperature increase. Thus, with subsonic flow, insufficient cooling is accomplished by passing the reaction products through the nozzle. However, if the relationship of reactor pressure ($P_c$) and nozzle exit pressure ($P_e$) is such as to maintain sonic velocity (Mach 1) in the nozzle throat, the flow of reaction products in the diverging section of the nozzle is further accelerated. Thus, supersonic velocities (greater than Mach 1) are obtained in the diverging section of the nozzle, and the pressure and temperature of the gases are further decreased. With any particular nozzle, uniform isentropic expansion of the gaseous reaction products to the nozzle exit ambient pressure is possible for only a certain ratio of reactor pressure to nozzle exit pressure, which can be termed the nozzle design pressure ratio. At other than the design pressure ratio, a normal shock front appears downstream of the nozzle throat, and downstream from this shock front subsonic velocities prevail. With the decrease from supersonic to subsonic velocities, there occurs also an increase in temperature and an increase in pressure to the nozzle exit pressure. The effect of a normal shock is more clearly shown by considering the case where a hot gas at a stagnation temperature of 1140° F. and a pressure of 12 atmospheres, K being equal to 1.4, is expanded through a nozzle and a shock front occurs at Mach 4. At Mach 4, the gas is at a temperature of −80° F. and a pressure of .078 atmosphere. However, just downstream from the shock front, at Mach 0.434, the gas is at a temperature of 1080° F. and a pressure of 1.40 atmospheres. It is thus seen that the temperature of the gas is only 60° F. less than the temperature of the expanded gas. Injection of a cooling medium into the diverging section of the nozzle where supersonic velocities prevail would produce a shock front with a compression of the gas and a temperature rise to nearly that of the unexpanded gas. Accordingly, the desired efficient and rapid cooling of the reaction products cannot be obtained by injecting a cooling medium into the nozzle at a location downstream from the nozzle throat. Injection of the cooling medium at the nozzle throat is also undesirable since this in effect alters the area of the throat and changes the flow pattern. In accordance with the instant invention, the cooling medium is introduced at a location upstream from the nozzle throat, i.e., prior to the attainment of sonic velocity in the nozzle. The cooling medium is broken up in the converging section of the nozzle into very fine droplets, thereafter being present in the nozzle in the form of a fog intimately admixed with the gaseous reaction products. Now when a shock front occurs downstream from the nozzle throat most of the heat which is released is consumed in vaporizing the fine droplets of the cooling medium rather than in increasing the temperature of the reaction products. Thus, the cooling medium functions to maintain the reaction products at near the temperature to which they were cooled in flowing through the nozzle.

The water or aqueous solutions used as the quenching medium, in addition to maintaining the reaction products at a temperature at which they are stable, perform another function which constitutes an important aspect of the present invention. Thus, the utilization of water makes it possible to effect a separation of the reaction products into two fractions, a water-soluble and a water-insoluble fraction. The hydrogen peroxide formed in the process is dissolved in the water, thus facilitating its separation from the reaction products. Since hydrogen peroxide is a valuable by-product of the present process, its separation and recovery is very desirable. In general, the amount of water introduced into the system is sufficient to provide for the existence of a condensed aqueous phase downstream from the nozzle.

After flowing through nozzle 17, the cooled reaction products are passed into a continuous centrifugal separator, such as liquid cyclone separator 31. It is usually preferred that the reaction products pass immediately into the cyclone from the diverging section of the nozzle in order that the separation of any oxygenated materials present in the reaction products can be rapidly accomplished. Any conventional liquid cyclone can be employed in the practice of the invention, e.g., cyclones as described by Tangel and Brison, Chemical Engineering, pages 234–238, June 1955. The size or area of the vortex finder and the apex valve opening of the cyclone are adjusted so as to remove substantially all of the condensed liquids through the apex valve. These materials which are removed from the cyclone through line 37 comprise an aqueous phase and a portion of the total organic phase. The overflow recovered from cyclone separator 31 through line 32 comprises principally the gaseous products together with a minor amount of entrained liquid. These gaseous materials comprising the olefinic product and some unreacted starting material are introduced into collector 33 from which condensate is recovered through line 36. An olefinic product stream, e.g., cyclohexene, when using cyclohexane as the starting material, is withdrawn from the collector through line 34. The gaseous product stream removed through line 34 can be thereafter cooled and purified in order to obtain the desired olefinic product. The underflow from cyclone separator 31 enters collector 38 through line 37. An aqueous phase and a hydrocarbon-rich phase collect in collector 38. The aqueous phase containing hydrogen peroxide is removed from collector 38 through line 41 while the hydrocarbon-rich phase is withdrawn through line 39. It is to be understood that in any particular operation the separation accomplished in the cyclone will depend upon the vapor pressure of the hydrocarbons at the temperature prevailing in the cyclone. In some cases most of the organic phase will be in the underflow while in others a major proportion of the organic phase will be in the overflow. Furthermore, in certain cases, the organic phase will be divided between the overflow and underflow from the cyclone.

Referring now to FIGURE 2 of the drawing, there is illustrated a modification of the reactor system of this invention. Identical reference numerals have been used to designate elements previously described in conjunction with FIGURE 1. Reactor 44 comprises an elongated tubular member 46 closed at one end by means of closure member 47. The other end of the tubular member is open, being connected to converging section 18 of nozzle 17. The reactor is provided with fluid inlet means 48 and 49 which communicate with the reaction zone formed within tubular member 46. It is noted that the fluid inlet lines are radially disposed and diametrically opposed as are the fluid inlets in the reactor shown in FIGURE 1. The reactor is also provided with a plurality of coolant introduction means 51 which communicate with the downstream end of the reaction zone. The fluid introduction means can also be positioned in the converging section of nozzle 17. However, as discussed in conjunction with FIGURE 1, it is not desired to place the coolant introduction means downstream from the throat section of the nozzle. Reactor 44 is illustrated as being provided with a pair of thermocouples 52 and 53. Thermocouple 52 is disposed opposite fluid inlets 48 and 49 while thermocouple 53 is positioned in a central portion of a reaction zone. This placement of the thermocouples permits the measurement of reaction temperatures in different parts of the reaction zone. It is also within the scope of the invention to provide pressure taps as shown in FIGURE 1 in order to obtain an indication of the reaction pressures employed in the process. When utilizing the apparatus of FIGURE 2, the process of this invention is carried out in essentially the same manner as described in conjunction with FIGURE 1.

A more complete understanding of the invention can be obtained by referring to the following illustrative examples, which are not intended, however, to be unduly limitative of the invention.

EXAMPLE I

A series of runs was conducted in which olefinic compounds were prepared by the oxidative dehydrogenation of paraffinic and cycloparaffinic hydrocarbons. In each of the runs, air was used as the oxidant and the air and hydrocarbon were preheated to about the desired reactor temperature prior to their introduction into the reactor. Apparatus similar to that shown in FIGURES 1 and 2 of the drawing were utilized in the runs. As set forth in the table hereinafter, the specific reactor used in each run is indicated by reference to the appropriate figure number as shown in the drawing. In the case of runs 1 and 2, the reactor had an internal diameter of 1 inch and a length of 3.5 inches, while in runs 3, 7 and 8, the reactor had a diameter of ½ inch and a similar length. In runs 4, 6 and 9, the reactor had an internal diameter of ½ inch and a length of 2⅜ inches while the reactor of run 5 had an internal diameter of ¾ inch and a similar length. The nozzle in each run had a throat of ¼ inch diameter. In calculating the residence or reaction times, the volume of the reaction zone was taken to include the volume of the reactor and the volume of that portion of the nozzle which included the converging section up to the nozzle throat. The average gas temperature was considered to be the reactor temperature. The point at which water was injected was at approximately the locations shown in the indicated figures. Thus, in runs 1, 2, 3, 7 and 8, the water was introduced into the downstream end of the reactor at a point adjacent the nozzle converging section. In runs 4, 5, 6 and 9, the water was injected into the converging section of the nozzle at a point upstream from the nozzle throat. The water in each run introduced into the reaction products, at a point prior to the attainment of sonic velocities which were reached in the nozzle throat. The cyclone which was employed had a length of about 12 inches and a 3 inch inside diameter cylindrical section. The vortex finder of the cyclone had an inside diameter of about 1.5 inches.

The operating conditions and the results obtained in the several runs are set forth in the following table.

*Table*

| Starting Material | Cyclohexane | | | | | | Decahydronaphthalene | n-Pentane | Isopentane | n-Decane |
|---|---|---|---|---|---|---|---|---|---|---|
| Run | 1 | 2 | 3 | 4 | 5 | 6 | 7 | 8 | 9 | |
| Figure of Drawing | 2 | 2 | 2 | 1 | 1 | 1 | 2 | 2 | 1 | |
| Reactor Vol., cubic inches | 2.90 | 2.90 | 1.58 | 0.40 | 1.05 | 0.40 | 1.58 | 1.58 | 0.40 | |
| Air, lb./hr | 194 | 172 | 172 | 175 | 153 | 169 | 170 | 173 | 174 | |
| Hydrocarbon, lb./hr | 270 | 190 | 215 | 210 | 212 | 224 | 222 | 220 | 224 | |
| Temperature, °F.: | | | | | | | | | | |
| Air | 800 | 800 | 900 | 1,100 | 1,200 | 940 | 820 | 900 | 920 | |
| Hydrocarbon | 800 | 820 | 840 | 1,020 | 900 | 895 | 790 | 890 | 800 | |
| Reactor | 1,080 | 1,058 | 1,160 | 1,045 | 1,360 | 1,360 | 1,125 | 1,045 | 1,280 | |
| Cyclone | 200 | 198 | 200 | 197 | 200 | 210 | 200 | 193 | 210 | |
| Pressures, p.s.i.a.: | | | | | | | | | | |
| Reactor | 200 | 166 | 165 | 150 | 158 | 164 | 190 | 182 | 174 | |
| Cyclone | 18.5 | 16.7 | 17.0 | 16.7 | 17.4 | 17.4 | 18.0 | 17.6 | 18.3 | |
| Water, lb./hr | 245 | 270 | 270 | 290 | 290 | 290 | 290 | 290 | 320 | |
| Cyclone underflow, lb./hr. | 65 | 107 | 100 | 120 | 90 | 160 | 75 | 98 | 112 | |
| Residence time, milliseconds | 7.35 | 7.25 | 5.65 | 0.89 | 2.28 | 0.97 | 4.10 | 4.10 | 1.36 | |
| Feed converted, percent | 14.7 | 16.0 | 16.0 | 2.14 | 14.5 | 12.9 | | | | |
| Efficiency of conversion, percent | 69.5 | 60.6 | 69.5 | 100 | 81.8 | 90.1 | | | | |
| Per pass conversion to olefin, percent | 10.2 | 9.7 | 11.1 | 2.14 | 11.85 | 11.6 | 5.4 | 4.01 | 2.5 | |
| Footnote | (a) | (a) | (b) | (a) | (c) | (d) | (e) | (f) | (g) | | a The olefin produced was cyclohexene with less than 0.5 percent diolefin.
b The weight ratio of monoolefins to diolefins in the products was 2.87.
c The weight ratio of monoolefin to diolefins in the products was 3.8.
d Olefins were collected in the underflow from the cyclone in this run.
e The per pass conversion to the various olefins was as follows: 1.8 percent of 1-pentene; 2.1 percent trans 2-pentene; and 1.5 percent cis 2-pentene.
f The per pass conversion to various olefins was as follows: 1.08 percent 2-methylbutene-1; 2.00 percent 2-methylbutene-2; and 0.93 percent of 3-methylbutene-1.
g In this run, no water was initially injected into the system, and temperature in the cyclone during this period reached 1600° F.

From the foregoing, it is seen that the distribution of products is neither that of thermodynamic equilibrium nor that predictable by a simple statistical approach. The distribution appears to be uniquely determined by the chemical kinetics involved.

EXAMPLE II

In this example, cyclohexene was prepared by the oxidative dehydrogenation of cyclohexane. Apparatus similar to that shown in FIGURE 2 of the drawing was employed. The reactor had an inside diameter of 1 inch and a length of 3.5 inches. As shown in FIGURE 2, one of the thermocouples measured the temperature of the reactants at the point of introduction while the other thermocouple measured the reaction temperature in an intermediate portion of the reactor. Water was introduced into the reactor at its downstream end at points adjacent the nozzle converging section from a series of nozzles located around a circumference of the reactor. The cyclone which was employed had a length of about 12 inches and a 3 inch inside diameter cyclindrical section. The vortex finder of the cyclone had an inside diameter of about 1.5 inches.

The air was preheated to a temperature of 800° F. and metered into the reactor at the rate of 172 pounds per hour. Cyclohexane was preheated to 820° F. and was introduced at the rate of 190 pounds per hour. The temperature of the gases as measured at the point of introduction was about 810° F. The temperature in the central portion of the reactor was 1058° F. which represents a 248° F. increase in temperature caused by the exothermic heat of the reaction. The reactor pressure was 166 p.s.i.a. (328 inches of mercury absolute). Water having a temperature of about 60° F. was used as the quenching medium, and the water was charged to the reactor at the rate of about 270 pounds per hour. The temperature of the stream introduced into the cyclone was 198° F., and the overflow and underflow streams from the cyclone were at this same temperature. The inlet pressure to the cyclone was 34 inches of mercury absolute. The cyclone was operated so as to give an underflow rate of about 107 pounds per hour. Under the foregoing conditions, the reaction time was found to be about 7.25 milliseconds. This reaction time was computed by using a reactor volume of 2.9 cubic inches and an average gas temperature equal to the temperature measured in the central portion of the reactor.

Analysis of a portion of the underflow from the cyclone revealed that the water solution contained 3.9 weight percent hydrogen peroxide. The solution was also found to contain 0.13 mol per liter total carbonyl (—CO—). Titration of the aqueous solution with standard alkali indicated an acid concentration of 0.089 N. The overflow from the cyclone was sampled over a three minute interval. The sample was passed through 350 milliliters of water, then through 2 Dry Ice traps, a sample bomb and a wet test meter. Analysis of the 350 milliliter portion of water indicated a peroxide content of only 0.003 percent. No aldehydes were found in the aqueous phase, indicating that the amount of oxygenated products, which were carried overhead from the cyclone, was very low or negligible. The organic phase which was condensed in the Dry Ice traps amounted to 12.5 milliliters. By analysis, this phase was found to contain 10.4 weight percent cyclohexene. These data illustrate the efficient separations that are obtained in accordance with the present process.

From the foregoing, it is seen that the present invention provides an improved process for producing unsaturated compounds. High conversions and high ultimate yields of the desired olefinic product are obtainable while making possible also the recovery of valuable by-products, such as hydrogen peroxide, as a separate process stream. The process is carried out at low reaction temperatures and low operating pressures while utilizing relatively small equipment which nonetheless has a very high capacity. It is thus seen that the process is very suitable for utilization in a commercial operation.

As will be evident to those skilled in the art, many variations and modifications can be practiced in view of the foregoing disclosure. Such variations and modifications are clearly believed to be within the spirit and scope of the invention.

I claim:

1. In a process in which an organic compound and an oxygen-containing gas contact one another in a reaction zone under conditions of temperature and pressure and for a contact time suitable for producing reaction products containing unsaturated organic compounds, the improvement which comprises flowing said reaction products from said reaction zone through a convergent-divergent mixing zone having a constricted section formed in an intermediate portion thereof; maintaining the ratio of the pressure in said reaction zone to the pressure in the downstream end of said mixing zone at a value such that said reaction products attain sonic velocity in said constricted section and supersonic velocity in the divergent section of said mixing zone; introducing a cooling medium into said reaction products flowing from said reaction zone and through said mixing zone at a location upstream from said constricted section of said mixing zone; and withdrawing stable reaction products from the downstream end of said mixing zone.

2. A process for preparing olefins by the oxidative dehydrogenation of saturated hydrocarbons which comprises contacting a saturated hydrocarbon with an oxygen-containing gas in a reaction zone under conditions of temperature and pressure and for a contact time suitable for producing reaction products containing an olefin; flowing said reaction products from said reaction zone through a convergent-divergent mixing zone having a constricted section in an intermediate portion thereof; maintaining the ratio of the pressure in said reaction zone to the pressure in the downstream end of said mixing zone at a value such that said reaction products attain sonic velocity in said constricted section and supersonic velocity in the divergent section of said mixing zone; introducing a cooling medium into said reaction products flowing from said reaction zone and through said mixing zone at a location upstream from said constricted section of said mixing zone; withdrawing from the downstream end of said mixing zone reaction products cooled to a temperature at which they are stable; passing said cooled reaction products into a separation zone; and withdrawing from said separation zone a stream rich in said olefin.

3. A process according to claim 2 in which the temperature in said reaction zone is in the range of about 600 to about 1800° F.; the pressure in said reaction zone is in the range of 35 to 1000 p.s.i.a.; the contact time is less than 1 second; and the pressure in the downstream end of said mixing zone is at about atmospheric.

4. A process according to claim 2 in which the temperature of said reaction products withdrawn from the downstream end of said mixing zone is less than 600° F.

5. A process according to claim 2 in which the temperature of said reaction products withdrawn from the downstream end of said mixing zone is in the range of about 50 to about 300° F.

6. A process according to claim 2 in which said saturated hydrocarbon is cyclohexane and said olefin is cyclohexene.

7. A process according to claim 2 in which said saturated hydrocarbon is n-pentane and said olefin is pentene.

8. A process according to claim 2 in which said saturated hydrocarbon is isopentane and said olefin is isopentene.

9. A process according to claim 2 in which said saturated hydrocarbon is n-decane and said olefin is decene.

10. A process according to claim 2 in which said saturated hydrocarbon is ethane and said olefin is ethylene.

11. A process according to claim 2 in which said saturated hydrocarbon is cyclopentane and said olefin is cyclopentene.

12. A process for preparing olefins by the oxidative dehydrogenation of a saturated hydrocarbon containing up to and including 20 carbon atoms per molecule, which comprises introducing said saturated hydrocarbon and air into a reaction zone; reacting said saturated hydrocarbon with said air in said reaction zone at a temperature in the range of about 600 to about 1800° F. and at a pressure in the range of 35 to 1000 p.s.i.a. for a period of from 0.0001 to 0.1 second; flowing the resulting reaction products containing an olefin and hydrogen peroxide from said reaction zone through an elongated mixing zone comprising a converging section, a throat section and a diverging section; maintaining a pressure in the downstream end of said diverging section of said mixing zone such that said reaction products attain sonic velocity in said throat section and supersonic velocity in the divergent section of said mixing zone; injecting water into said reaction products at a location upstream from said throat section of said mixing zone; withdrawing from the downstream end of said diverging section said mixing zone reaction products cooled to a temperature at which they are stable; passing said cooled reaction products into a separation zone; withdrawing from said separation zone a stream rich in said olefin; and withdrawing from said separation zone a liquid stream rich in hydrogen peroxide.

13. A process according to claim 12 in which from 1 to 12 mols of water per mol of said saturated hydrocarbon is injected into said reaction products.

References Cited in the file of this patent
UNITED STATES PATENTS

| | | |
|---|---|---|
| 2,661,380 | Orkin | Dec. 1, 1953 |
| 2,809,981 | Kittleson et al. | Oct. 25, 1957 |
| 2,823,243 | Robinson | Feb. 11, 1958 |
| 2,905,731 | Seed | Sept. 22, 1959 |
| 2,908,733 | Sage | Oct. 13, 1959 |